US007012407B2

(12) United States Patent
Zhang

(10) Patent No.: US 7,012,407 B2
(45) Date of Patent: Mar. 14, 2006

(54) CHARGING AND DISCHARGING CONTROL CIRCUIT AND CHARGING TYPE POWER SUPPLY UNIT

(75) Inventor: Wei Zhang, Chiba (JP)

(73) Assignee: Seiko Instruments Inc., Chiba (JP)

( * ) Notice: Subject to any disclaimer, the term of this patent is extended or adjusted under 35 U.S.C. 154(b) by 143 days.

(21) Appl. No.: 10/670,723

(22) Filed: Sep. 25, 2003

(65) Prior Publication Data

US 2004/0104708 A1 Jun. 3, 2004

(30) Foreign Application Priority Data

Sep. 27, 2002 (JP) ............................. 2002-283232

(51) Int. Cl.
*H02J 7/16* (2006.01)
(52) U.S. Cl. ..................................... 320/151
(58) Field of Classification Search ................ 320/151, 320/116, 149
See application file for complete search history.

(56) References Cited

U.S. PATENT DOCUMENTS 5,493,197 A * 2/1996 Eguchi et al. .............. 320/116
5,739,671 A * 4/1998 Hamada ..................... 320/149

FOREIGN PATENT DOCUMENTS

JP 06141479 * 5/1994

* cited by examiner

*Primary Examiner*—Pia Tibbits
(74) *Attorney, Agent, or Firm*—Adams & Wilks

(57) ABSTRACT

The invention provides: a charging and discharging control circuit which includes a charging and discharging control terminal having a test function as well and which is capable of conducting switch over among a normal application state, a charging and discharging prohibition state, and a test state; and a charging type power supply unit. Any one of a level "L", "H", or "M" of a voltage inputted to a charging and discharging control terminal is selected using the charging and discharging control terminal and a test fuse to allow switch over to the normal application state, the charging and discharging prohibition state, or the test state. In the test state, two modes for shortening a test delay time are realized depending on whether or not the test fuse is cut.

8 Claims, 2 Drawing Sheets

DIAGRAM SHOWING EMBODIMENT OF PRESET INVENTION

DIAGRAM SHOWING EMBODIMENT OF PRESET INVENTION

SIGNALS CTLm AND CTLh DUE
TO VOLTAGE APPLIED TO TERMINAL CTL

DIAGRAM SHOWING EMBODIMENT OF CONVENTIONAL CHARGING AND DISCHARGING CONTROL CIRCUIT

CHARGING AND DISCHARGING CONTROL CIRCUIT AND CHARGING TYPE POWER SUPPLY UNIT

BACKGROUND OF THE INVENTION

1. Field of the Invention

The present invention relates in general to a charging and discharging control circuit having a terminal for charging and discharging control, and a charging type power supply unit. In particular, the invention relates to a charging and discharging control circuit in which the charging and discharging control terminal is made to have a test function as well so that a single external terminal has both a charging and discharging control function and the test function, and to a charging type power supply unit.

The present invention relates to a secondary battery protection circuit having both a charging and discharging control function and a test function, and a mass production technique for reducing a test time for a charging type power supply unit incorporating therein the secondary battery protection circuit.

2. Description of the Related Art

The features of a lithium ion secondary battery which has greatly contributed to the popularization of mobile devices typified by a mobile telephone and a PHS are its small size, lightweight, and a large capacity. Those features have led to realization of long time driving and lightness of the mobile devices. However, since a secondary battery is repeatedly charged and discharged, there is a high probability that it will become an overcharge state or an overdischarge state. If the secondary battery becomes the overcharge state, a battery temperature rises so that an internal pressure of the secondary battery is increased and metal Li is precipitated due to generation of a gas owing to decomposition of an electrolyte. Thus, there is a risk of ignition or explosion of the battery. Conversely, if the secondary battery becomes the overdischarge state, the electrolyte is decomposed to deteriorate the characteristics of the battery. In order to prevent such situations from occurring, a protection circuit is incorporated in a battery pack.

It has become the basic technique for a protection circuit to provide a charging and discharging control switch circuit in a charging and discharging path between a secondary battery and a main body of a mobile device, and to detect, by means of a charging and discharging circuit, charging of the secondary battery up to a level equal to or higher than a predetermined voltage, discharging of the secondary battery down to a level equal to or lower than a predetermined voltage, discharging of the secondary battery in the form of an excessive current, to turn OFF the charging and discharging control switch in order to prevent the secondary battery from becoming any of an overcharge state, an overdischarge state, and an overcurrent state.

In order to cope with a case where a battery pack is taken off from a main body of a mobile device and a case where charge and discharge prohibition control is required for the main body of the mobile device, a charging and discharging control terminal is provided in many secondary battery protection circuits.

Since a lithium ion secondary battery has a large internal impedance, the apparent battery voltage is changed due to a charge current and a discharge current. While the charge current is caused to flow, the apparent battery voltage is high. On the other hand, while the discharge current is caused to flow, the apparent battery voltage is low. For the purpose of efficiently using the battery, there is a need to provide a delay time for each of detection of overcharge and detection of overdischarge. In addition, for the purpose of preventing false release due to noises, there is a need to provide a release delay time. It is disclosed in JP 2001-283932 A (pp. 1 to 6 and FIG. 1), for example, to provide the above-mentioned delay times by an internal delay circuit to shorten test times for overcharge and overdischarge. Since this internal delay circuit provides all the delay times, there is no need to provide an external capacitor for determining a delay time, and as a result, it is possible to reduce the number of external components or parts required for a protection circuit.

However, in a charging and discharging control circuit using a built-in delay circuit, a delay time cannot be easily changed from the outside. Thus, it takes a great deal of time to evaluate the characteristics of the charging and discharging control circuit due to the delay times. Since delay times for detection of an overcurrent and detection of an overdischarge are generally in the range of about several msec to about several hundreds msec, it does not exert a very large on the test time. However, since the delay time for detection of an overcharge is normally set to about several seconds, it takes a lot of time to carry out the test. Consequently, there is a need to provide a test mode adapted to shorten a delay time in the charging and discharging control circuit using the built-in delay circuit.

In JP 2001-283932 A (pp. 1 to 6, and FIG. 1), there are disclosed a charging and discharging control circuit which enters a test mode in which a delay time of an internal control circuit is shortened when a voltage equal to or higher than a prescribed voltage is applied to a charger connection terminal, and a charging type power supply unit. FIG. 3 shows an embodiment of the invention described in JP 2001-283932 A. When a secondary battery becomes an overcharge state, an output signal from an overcharge detection comparator 113 goes to a high level, and an internal control circuit 120 outputs a control signal to an internal delay circuit 121. After a lapse of a delay time t1 as prescribed with the output voltage as an input signal, the internal delay circuit 121 outputs a signal for controlling a switch circuit 102.

Further, when a voltage at an overcurrent detection terminal has increased up to a level equal to or higher than a prescribed voltage V1, an output signal from a voltage detection comparator 115 goes to a high level. When the output signal from the voltage detection comparator 115 goes to the high level, the internal control circuit 120 enters a state in which the internal control circuit 120 is ready to output a control signal for shortening a delay time in the internal delay circuit 121, and maintains this state. When the secondary battery becomes the overcharge state, the output signal from the overcharge detection comparator 113 goes to the high level and then the internal control circuit 120 outputs the control signal to the internal delay circuit 121. After a lapse of a delay time t2 as prescribed with the output voltage as an input signal, the internal delay circuit 121 outputs a signal for controlling the switch circuit 102. As a result, once the voltage at the overcurrent detection terminal becomes a voltage equal to or higher than the prescribed voltage, the delay time remains shortened. Thereafter, the overcharge detection voltage can be measured in a state in which the overcharge delay time remains shortened.

On the other hand, when the voltage at the overcurrent detection terminal has decreased down to a level equal to or lower than a prescribed voltage V2, an output signal of a voltage detection comparator 114 goes to a high level. When the output signal of the voltage detection comparator 114 becomes the high level, the internal control circuit 120 releases the state in which it outputs the control signal for shortening the delay time which is provided by the internal delay circuit 121, thereby returning the current delay time back to the normal delay time t1. As a result, once the voltage at the overcurrent detection terminal becomes a level equal to or lower than the prescribed voltage V2, the test mode is released to provide the normal state.

In the invention disclosed in JP 2001-283932 A, shortening the internal delay time by utilizing the overcurrent detection terminal is effective for reduction of cost. However, this system is more inconvenient than a system in which an independent external terminal used for testing (hereinafter referred to as "test terminal") is provided in order to control a delay time used for testing (hereinafter referred to as the "test delay time"). In particular, this system is even more inconvenient when used for a test of a secondary battery pack carried out at a customer's place. Moreover, in a case where it becomes necessary to divide an overcurrent detection voltage into plural levels for control, with the above-mentioned technique, there is encountered a problem in that the circuit configuration becomes complicated, making it impossible to cope with such case.

However, if a test terminal is further independently provided in the secondary battery protection circuit having the charging and discharging control terminal therein, then the number of pins for control is increased accordingly to increase cost.

In addition, in a case where an overcharge detection voltage is to be accurately measured when carrying out initial measurement for trimming to set voltages for the detection of overcharge and overdischarge and the release thereof at a plant, whenever an input voltage is stepped, a latency time equal to or larger than several seconds is required. Thus, even if a detection voltage can be measured in 25 steps, when a latency time is assumed to be 5 seconds, a time required for the measurement of the overcharge detection voltage becomes 125 seconds. Even if the system has a test mode in which a delay time is shortened to 1/50 of that time, the measurement takes as long as 2.5 seconds for one chip. Thus, it takes too much time to mass produce control circuits and hence this becomes a serious problem in terms of testing cost.

That is to say, there is a need to further shorten a detection delay time for the initial measurement made at a plant for a delay circuit built-in secondary battery charging and discharging control circuit. Also, both a delay time in normal use and a test mode adapted to shorten the delay time are required for the secondary measurement and evaluation made at a customer's place. It is a challenge to realize such a control function with few external terminals.

SUMMARY OF THE INVENTION

The present invention aims at making a terminal for charging and discharging control have a test function as well so that a single pin has both a charging and discharging control function and a test function to thereby reduce cost. Thus, an object of the present invention is to control a detection delay time in a charging and discharging control circuit using the test function of the above-mentioned charging and discharging control terminal and to provide plural test time shortening modes in order to achieve cost reduction.

In order to attain the above-mentioned objects, the present invention has the following constitution.

According to a first aspect of the present invention, in a charging type power supply unit including: a switch circuit and a secondary battery connected in series with an external power supply terminal; and a charging and discharging control circuit connected in parallel with the secondary battery in order to control the switch circuit, the charging and discharging control circuit is provided with a charging and discharging control terminal, and the control circuit has a unit which, in accordance with a voltage level inputted to the control terminal, monitors one or both of a voltage and a current of the secondary battery to control the switch circuit to thereby conduct switch over to any one of a normal application state in which charging and discharging of the secondary battery are controlled (hereinafter referred to as a normal state), a charging and discharging prohibition state in which the charging and discharging of the secondary battery are forcibly prohibited (hereinafter referred to as a charging and discharging prohibition state), and a test state in which characteristics of the control circuit are evaluated (hereinafter referred to as a test state).

In addition, the charging and discharging control circuit is provided with a built-in delay circuit including an oscillator and a counter and becomes the normal state when a voltage inputted to the charging and discharging control terminal is at a certain level. After the charging and discharging control circuit has detected overcharge, overdischarge, or an overcurrent of the secondary battery in this state, it turns OFF the switch circuit after a lapse of a delay time caused by the built-in delay circuit.

In addition, the charging and discharging control circuit becomes the charging and discharging prohibition state when the voltage inputted to the charging and discharging control terminal is at a certain level. In this state, the charging and discharging control circuit turns OFF the switch circuit to thereby forcibly prohibit the charging and discharging of the secondary battery.

Also, the charging and discharging control circuit becomes the test state when the voltage inputted to the charging and discharging control terminal is at a certain level. The charging and discharging control circuit has an acceleration unit for accelerating an oscillation frequency of an oscillator constituting the built-in delay circuit in the test state.

Moreover, the charging and discharging control circuit is provided with a fuse used for testing (hereinafter referred to as the "test fuse"). The charging and discharging control circuit becomes the test state when the voltage inputted to the charging and discharging control terminal is at a certain level. The charging and discharging control circuit has a unit for switching over a mode of a detection delay time to any one of a delay time mode in which a part of delays in the charging and discharging control circuit is not performed via a counter of the built-in delay circuit (hereinafter referred to as a delay time mode 1) and a delay time mode in which all of the delays in the charging and discharging control circuit are performed via the counter of the built-in delay circuit (hereinafter referred to as a delay time mode 2) in the test state.

When carrying out the initial measurement for trimming to set voltages for the detection of overcharge, overdischarge, and the release at a plant, the voltage at a certain level is inputted to the charging and discharging control terminal to thereby make the charging and discharging control circuit become the test state so that the test fuse is not cut. As a result, the mode of the detection delay time becomes the delay time mode 1. In this state, the oscillation frequency of the oscillator constituting the built-in delay circuit is increased and delays for detection of the overcharge and detection of the overdischarge are not performed via the counter, the period of the circuit directly becomes the oscillation period of the oscillator. Even if an input voltage is stepped in order to accurately measure the overcharge and overdischarge detection voltages, since a latency time is greatly shortened, a test time is largely shortened. While in the delay time mode 1 other delays (a delay for overcurrent detection and all release delays) are performed via the counter, all these delays become shortened due to the acceleration of the oscillation frequency of the oscillator.

When the secondary test and the evaluation at a customer's place are to be carried out, the voltage at a certain level is applied to the charging and discharging control terminal so that the charging and discharging control circuit becomes the test state to cut the test fuse. As a result, the mode of the detection delay time becomes the delay time mode 2. In this state, the oscillation frequency of the oscillator constituting the built-in delay circuit is increased. While all the delays, including the overcharge and overdischarge delay times, are performed via the counter, these delays are all shortened due to the acceleration of the oscillation frequency of the oscillator. In the delay time mode 2, not only the test time required to measure the values of the overcharge, overdischarge, and overcurrent detection voltages can be shortened, but also each delay time can be evaluated.

On the other hand, inputting the voltage at a certain level to the charging and discharging control terminal allows the operation state of the charging and discharging control circuit to be made the normal state. As a result, the oscillation frequency of the oscillator constituting the built-in delay circuit is made the normal oscillation frequency. Since in this state all the detection delays and release delays including the overcharge and overdischarge detection delay times are performed via the counter and signals with those delays are sent to the control circuit, the delay times become the delay times in normal application.

DESCRIPTION OF THE PREFERRED EMBODIMENTS

Figure 1:
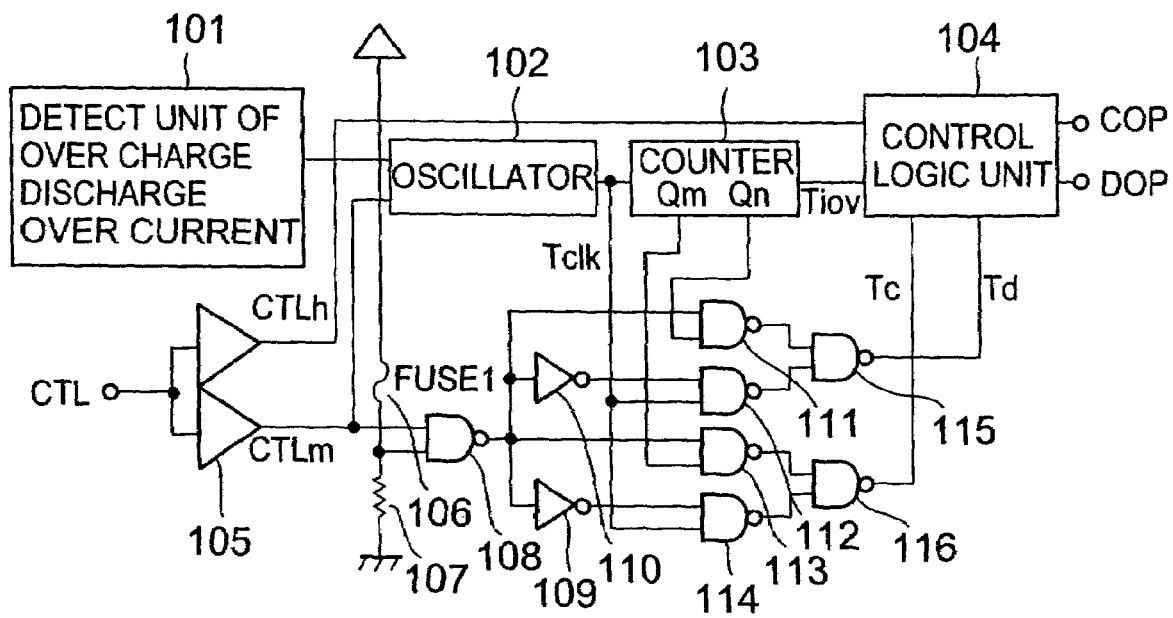
FIG. 1 is a circuit diagram, partly in block diagram, showing an embodiment of the present invention.

An embodiment of the present invention will hereinafter be described in detail with reference to the accompanying drawings. FIG. 1 is a circuit diagram, partly in block diagram, for explaining an embodiment of the present invention. In the figure, reference numeral 101 designates an overcharge, overdischarge and overcurrent detection circuit. Reference numeral 102 designates an oscillation circuit having a clock period Tclk. Reference numeral 103 designates a counter. Further, reference numeral 104 designates a charging and discharging control unit. With the control unit 104, there is realized a function of turning ON/OFF, through an output terminal COP for charging control and an output terminal DOP for discharging control, a charging and discharging control switch installed in a charging and discharging path between a secondary battery and a main body of a mobile device to thereby protect the secondary battery, on the basis of information on a battery state, charge, discharge currents, etc which is obtained from the overcharge, overdischarge, and overcurrent detection circuit 101.

Figure 2:
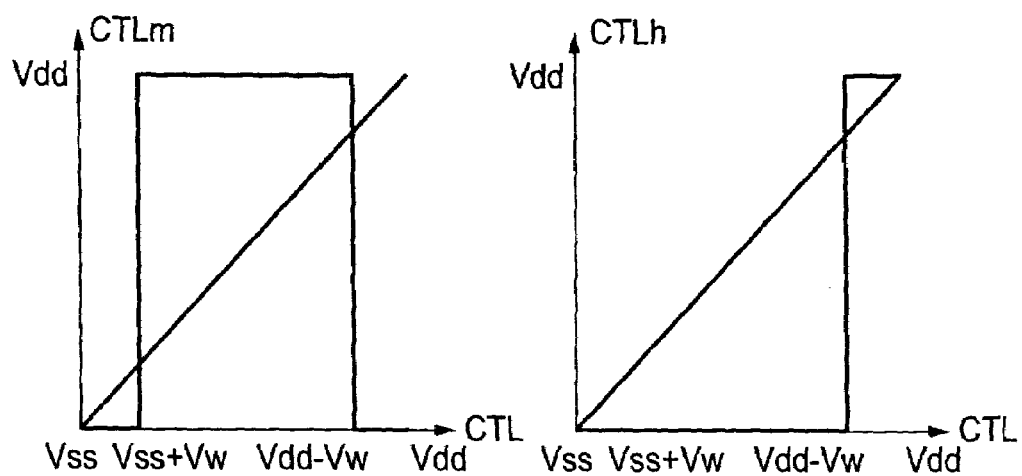
FIG. 2 is a graphical representation showing a relationship between signals CTLm and CTLh, and a voltage applied to a terminal CTL.
Figure 3:
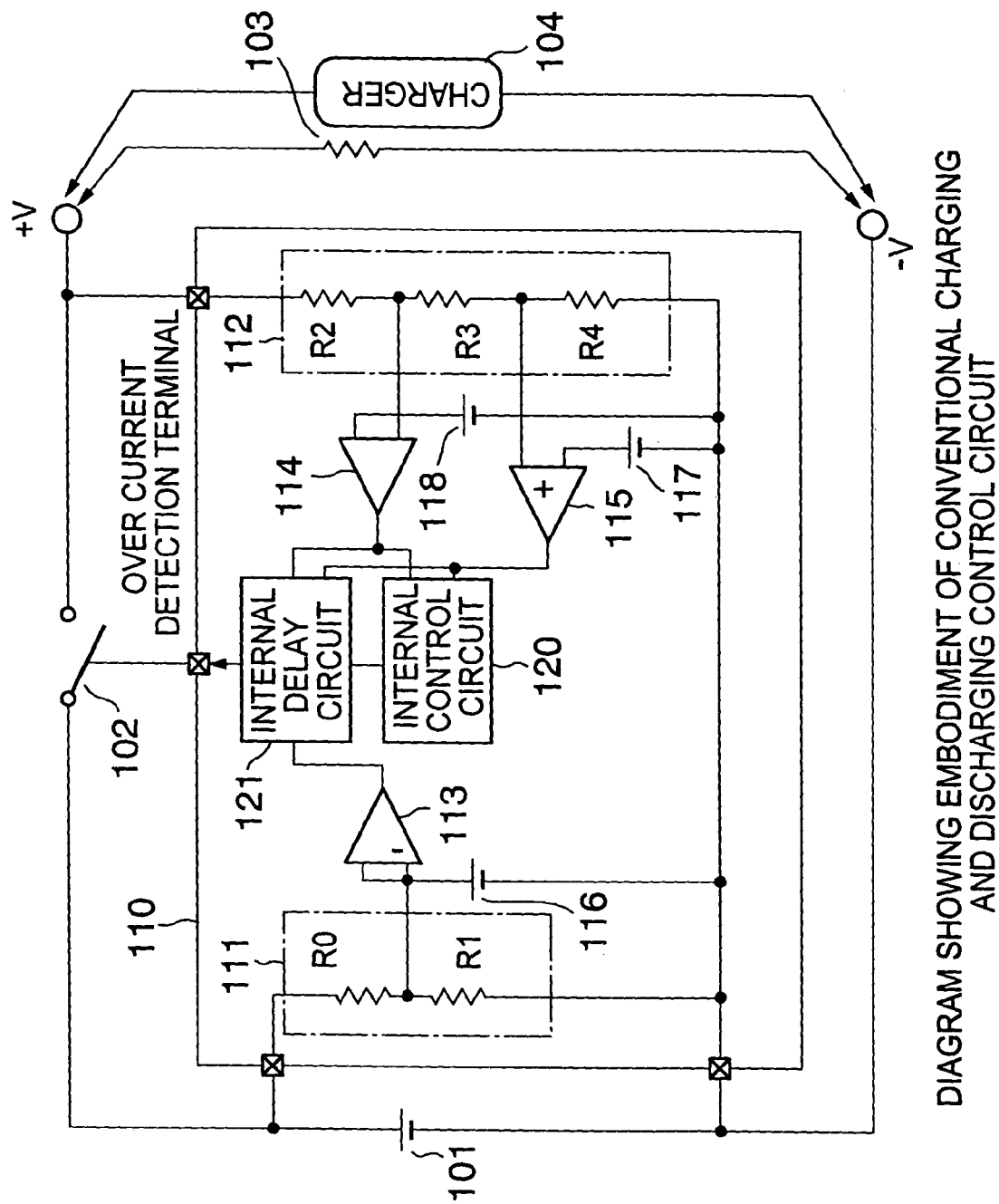
FIG. 3 is a circuit diagram, partly in block diagram, showing an example of a conventional charging and discharging control circuit; and TABLE 1 shows details of control mode made by the CTL terminal.

Also, in the figure, reference numeral 105 designates a circuit for detecting an input voltage applied to a terminal CTL for overcharge and overdischarge control. A level "H", "L" or "M" of the voltage inputted to the terminal CTL is detected by the detection circuit 105 to send signals CTLh and CTLm, which indicate the level of the voltage inputted to the terminal CTL, to the charging and discharging control unit and a delay circuit, respectively. FIG. 2 shows a relationship between the signals CTLh and CTLm and the voltage inputted to the terminal CTL. While the voltage inputted to the terminal CTL is smaller than (Vss+Vw), each of the signals CTLm and CTLh is at the level "L". In this case, the voltage at the terminal CTL is at the level "L". While the voltage at the terminal CTL is larger than (Vss+Vw), but smaller than "Vdd−Vw", the signal CTLm is at the level "H", whereas the signal CTLh is at the level "L". In this case, the voltage at the terminal CTL is at the level "M". While the voltage at the terminal CTL is larger than "Vdd−Vw", the signal CTLm is at the level "L", whereas the signal CTLh is at the level "H". In this case, the voltage at the terminal CTL is at the level "H".

As shown in FIG. 2, while the voltage at the terminal CTL is at the level "H", the signal CTLh is at the level "H". As a result, the charging and discharging control circuit becomes a charging and discharging prohibition state. Then, the charging and discharging control unit 104 turns OFF both an external switch for charging control and an external switch for discharging control through the output terminal COP for charging control and the output terminal DOP for discharging control to become a charging and discharging prohibition state.

On the other hand, while the voltage at the terminal CTL is at the level "L", each of the signals CTLh and CTLm is at the level "L". As a result, the charging and discharging control circuit becomes a normal state. In this state, the charging and discharging control unit 104 turns ON/OFF the external switch for charging control and the external switch for discharging control through the output terminal COP for charging control and the output terminal DOP for discharging control on the basis of information on a battery state, a charge current, a discharge current, etc which is obtained from the overcharge, overdischarge and overcurrent detection circuit 101. Since the signal CTLm is at the level "L", the oscillator 102 is caused to oscillate at a normal oscillation frequency. A clock period is Tclk. In addition, since a logic output signal from a NAND 108 goes to the level "H", delay times for detection of overcharge and overdischarge become delay times obtained from the counter 103. For example, if the detection circuit 101 detects that the secondary battery is in the overcharge state, it causes the oscillator 102 to oscillate to send a clock signal having a period Tclk to the counter 103. Since the overcharge detection delay time is obtained from a terminal Qm corresponding to the m-th stage of the counter, the overcharge detection delay time Tc is expressed as follows:

$$Tc = 2^{m-1} \times Tclk \qquad \text{(Expression 1)}$$

After a lapse of this delay time, the charging and discharging control unit 104 turns OFF the external switch for charging control through the output terminal COP for charging control. Likewise, since the overdischarge detection delay time is obtained from a terminal Qn corresponding to the n-th stage of the counter, the overdischarge detection delay time Td is expressed as follows:

$$Td=2^{n-1} \times Tclk \quad \text{(Expression 2)}$$

If the detection circuit 101 detects the overdischarge state of the secondary battery, then after a lapse of the overdischarge detection delay time, the charging and discharging control unit 104 turns OFF the external switch for charging control through the output terminal DOP for discharging control. For example, if the period Tclk of the oscillator 102 is 300 $\mu$sec, the overcharge detection delay time is obtained from a terminal Q15 corresponding to the 15-th stage of the counter 103, and the overdischarge delay time is obtained from a terminal Q10 corresponding to the 10-th stage of the counter, then the overcharge detection delay time Tc and the overdischarge detection delay time Td become 4.9 sec and 154 msec from Expressions 1 and 2, respectively.

While the voltage at the terminal CTL is at the level "M", the signal CTLh is at the level "L", and the signal CTLm is at the level "H". In this case, the charging and discharging control unit 104 turns ON/OFF the external switch for charging control and the external switch for discharging control through the output terminal COP for charging control and the output terminal DOP for discharging control, on the basis of information on a battery state, a charge current, a discharge current, etc which is obtained from the overcharge, overdischarge and overcurrent detection circuit 101. However, since the signal CTLm is at the level "H", the oscillator 102 is caused to oscillate at an accelerated oscillation frequency. If the oscillation frequency of the oscillator is accelerated by K times, then the clock period becomes Tclk/K. In addition, since a logic output signal of the NAND 108 depends on whether or not a Fuse 1 denoted by reference numeral 106 is cut, the delay times for detection of overcharge and detection of overdischarge can be either directly obtained from an output signal of the oscillator 102 or indirectly obtained from the counter 103.

When carrying out the initial measurement for trimming to set voltages for the detection of overcharge, overdischarge, and the release at a plant, since the test Fuse 1 (106) is not being cut, the logic output signal from the NAND 108 goes to the level "L". In this case, since the delay times for detection of overcharge and detection of overdischarge are directly obtained from the output signal of the oscillator 102, the overcharge detection delay time Tc is expressed as follows:

$$Tc=Tclk/K \quad \text{(Expression 3)}$$

Also, the overdischarge detection delay time Td is expressed as follows:

$$Td=Tclk/K \quad \text{(Expression 4)}$$

In addition, since the delay times for the overcurrent and all the release delay times are obtained from the counter 103, these delay times are only due to the acceleration of the oscillation frequency of the oscillator. This mode of the detection delay time is the above-mentioned delay time mode 1. For example, if the period Tclk of the oscillator is 300 $\mu$sec, and an acceleration multiple K of the oscillator is 50, then each of the overcharge detection delay time Tc and the overdischarge detection delay time Td becomes 6 $\mu$sec from Expressions 3 and 4, respectively. Thus, while the overcharge detection delay time in the normal state takes as long as several seconds, each of the above-mentioned delay times takes only several microseconds. As a result, when an overcharge detection voltage value is to be accurately measured, it becomes possible to greatly save a test time.

When the secondary test and the evaluation at a customer's place are to be carried out, since the test Fuse 1 denoted 106 becomes a state of being cut, the logic output signal from the NAND 108 goes to the level "H". In this case, the delay times for the detection of overcharge and detection of overdischarge become the delay times obtained from the counter 103 similarly to the normal state. But, at this time, since the signal CTLm is at the level "H" and hence the oscillation frequency of the oscillator is accelerated by K times, the overcharge detection delay time Tc is expressed as follows:

$$Tc=2^{m-1} \times Tclk/K \quad \text{(Expression 5)}$$

Also, the overdischarge delay time Td is expressed as follows:

$$Td=2^{n-1} \times Tclk/K \quad \text{(Expression 6)}$$

In addition, the overcurrent delay time and all the release delay times are also shortened due to the acceleration of the oscillation frequency of the oscillator. This mode of the detection delay time is the above-mentioned delay time mode 2. For example, if the period Tclk of the oscillator is 300 $\mu$sec, and the acceleration multiple K of the oscillator is 50, then the overcharge detection delay time Tc and the overdischarge delay time Td become 98 msec and 3 msec from Expression 5 and 6, respectively. As a result, not only the delay times can be shortened for the measurement of the overcharge voltage value and the overdischarge voltage value, but also each of the delay times can be evaluated.

TABLE 1 gives a detailed summary on how the charging and discharging prohibition function and the test function are controlled in accordance with the voltage level "H", "L", or "M" at the charging and discharging control terminal CTL. By performing such control, the test time can be shortened and also a long delay time can be ensured, and the delay time in the initial measurement carried out at a plant can be omitted.

As described hereinabove, according to the present invention, a single charging and discharging control terminal is made to have the test function as well, and also any one of the three levels of the voltage to be inputted to the control terminal is selected to allow the operation state to be switched over to any one of the normal state, the charging and discharging prohibition state, and the test state. Moreover, there is realized the unit for switching the mode of the detection delay time of the charging and discharging control circuit and the charging type power supply unit over to any one of the delay time mode 1 and the delay time mode 2 in accordance with whether or not the test fuse is cut in the test state. As a result, in the charging and discharging control circuit and the charging type power supply unit devised according to the present invention, the charging and discharging control function and the test function are realized with few external terminals. Also, in the test function, plural delay time modes are provided, whereby the high efficiency for the test time is realized. Consequently, the present invention greatly contributes to cost reduction in mass production.

TABLE 1

Details of control made by CTL terminal

| CTL Potential | Delay time mode 1 (Fuse 1 is not cut) | Delay time mode 2 (Fuse 1 is cut) |
|---|---|---|
| L: normal state | Oscillator oscillates at normal oscillation frequency<br>Overcharge detection delay time<br>$Tc = 2^{n-1}*Tclk$<br>Overdischarge detection delay time<br>$Td = 2^{n-1}*Tclk$<br>Other delay time<br>$Tx = 2^{x-1}*Tclk$ | Oscillator oscillates at normal oscillation frequency<br>Overcharge detection delay time<br>$Tc = 2^{n-1}*Tclk$<br>Overdischarge detection delay time<br>$Td = 2^{n-1}*Tclk$<br>Other delay time<br>$Tx = 2^{x-1}*Tclk$ |
| M: test state | Oscillation frequency of oscillator is accelerated by K times<br>Overcharge detection delay time<br>$Tc = Tclk/K$<br>Overdischarge detection delay time<br>$Td = Tclk/K$<br>Other delay time<br>$Tx = 2^{x-1}*Tclk/K$ | Oscillation frequency of oscillator is accelerated by K times<br>Overcharge detection delay time<br>$Tc = 2^{n-1}*Tclk/K$<br>Overdischarge detection delay time<br>$Td = 2^{n-1}*Tclk/K$<br>Other delay time<br>$Tx = 2^{x-1}*Tclk/K$ |
| H: charging and discharging prohibition state | Charging and discharging prohibition | Charging and discharging prohibition |

What is claimed is:

1. A charge discharge control circuit, comprising:
a detecting circuit for monitoring a state of a secondary battery, a delay circuit for generating a delay time in response to an output from the detecting circuit, a switch control circuit for controlling a switch circuit in response to outputs form the detecting circuit and the delay circuit, and
a circuit for switching a state of the charge discharge control circuit to any one of a normal application state in which charging and discharging of the secondary battery are controlled, a charging and discharging prohibition state in which the charging and discharging of the secondary battery are forcibly prohibited, and a test state in which characteristics of the charge and discharging control circuit are evaluated, in accordance to receiving a signal from the detecting circuit in response to a voltage of the secondary battery.

2. A charge discharge control circuit according to claim 1, wherein the charging and discharging prohibition state is accomplished by means of that the switch control circuit controls the switch circuit to turn OFF in response to a signal from the detecting circuit.

3. A charge discharge control circuit according to claim 1, wherein the delay circuit comprises an oscillation circuit and an acceleration means, the acceleration means accelerating the oscillation circuit to increase oscillation cycle in the test state.

4. A charge discharge control circuit according to claim 3, wherein the charge discharge control circuit further comprises a fuse and the delay circuit comprises a counter circuit, a signal from the oscillation circuit being outputted to the switch control circuit through the counter circuit when the fuse is in the disconnection state in the test state.

5. A charging type power supply device, comprising:
a charge discharge control circuit including a detecting circuit for monitoring a state of a secondary battery, a delay circuit for generating a delay time in response to an output from the detecting circuit, a switch control circuit for controlling a switch circuit in response to outputs form the detecting circuit and the delay circuit, and a circuit for switching a state of the charge discharge control circuit to any one of a normal application state in which charging and discharging of the secondary battery are controlled, a charging and discharging prohibition state in which the charging and discharging of the secondary battery are forcibly prohibited, and a test state in which characteristics of the charge and discharging control circuit are evaluated, in accordance to receiving a signal from the detecting circuit in response to a voltage of the secondary battery, and
an external power supply terminal,
wherein the secondary battery and the switch circuit are connected in series with the external power supply terminal, and the secondary battery and the charge discharge control circuit are connected with parallel to control the switch circuit.

6. A charging type power supply device according to claim 5, wherein the charging and discharging prohibition state is accomplished by means of that the switch control circuit controls the switch circuit to turn OFF in response to a signal from the detecting circuit.

7. A charging type power supply device according to claim 5, wherein the delay circuit comprises an oscillation circuit and an acceleration means, the acceleration means accelerating the oscillation circuit to increase oscillation cycle in the test state.

8. A charging type power supply device according to claim 7, wherein the charge discharge control circuit further comprises a fuse and the delay circuit comprises a counter circuit, a signal from the oscillation circuit being outputted to the switch control circuit through the counter circuit when the fuse is in the disconnection state in the test state.

* * * * *